US008544076B2

(12) United States Patent
Bhuta et al.

(10) Patent No.: US 8,544,076 B2
(45) Date of Patent: Sep. 24, 2013

(54) USING A TRUSTED TOKEN AND PUSH FOR VALIDATING THE REQUEST FOR SINGLE SIGN ON

(75) Inventors: Mahesh Babubhai Bhuta, Coral Springs, FL (US); Fernando Guerrero, Plantation, FL (US); James Andrew Godfrey, Waterloo, CA (US); Graham Russell, Cambridge, CA (US)

(73) Assignee: BlackBerry Limited, Waterloo (CA)

( * ) Notice: Subject to any disclaimer, the term of this patent is extended or adjusted under 35 U.S.C. 154(b) by 307 days.

(21) Appl. No.: 12/944,155

(22) Filed: Nov. 11, 2010

(65) Prior Publication Data

US 2011/0283347 A1 Nov. 17, 2011

Related U.S. Application Data

(60) Provisional application No. 61/260,353, filed on Nov. 11, 2009.

(51) Int. Cl.
*H04L 29/06* (2006.01)

(52) U.S. Cl.
USPC .............. 726/9; 726/4; 726/5; 726/8; 726/10; 726/20

(58) Field of Classification Search
USPC ...................... 726/9, 10, 8, 4, 5, 20
See application file for complete search history.

(56) References Cited

U.S. PATENT DOCUMENTS

| | | | |
|---|---|---|---|
| 7,174,383 B1 | 2/2007 | Biswas et al. | |
| 7,991,158 B2 * | 8/2011 | Narendra et al. | 380/260 |
| 2002/0169988 A1 | 11/2002 | Vandergeest et al. | |
| 2003/0188193 A1 | 10/2003 | Venkataramappa | |
| 2004/0054932 A1 | 3/2004 | Veneklase | |
| 2004/0122907 A1* | 6/2004 | Chou et al. | 709/207 |
| 2006/0021018 A1* | 1/2006 | Hinton et al. | 726/10 |

(Continued)

FOREIGN PATENT DOCUMENTS

| | | |
|---|---|---|
| EP | 1633102 A1 | 3/2006 |
| WO | 03100629 A1 | 12/2003 |

OTHER PUBLICATIONS

Extended European Search report mailed May 13, 2011. In corresponding application No. 10190928.1.
Mobile E-SSO—Seamless internet-to-intranet access.www.evidian.com or contact us: info@evidian.com. Retrieved Mar. 2008.

(Continued)

*Primary Examiner* — Dustin Nguyen
*Assistant Examiner* — Hao Nguyen
(74) *Attorney, Agent, or Firm* — Novak Druce Connolly Bove + Quigg LLP

(57) ABSTRACT

Providing access to an enterprise application from a telecommunications device via a client, through a device server, and an intermediate application gateway (IAG), is disclosed. The server is communication with the client and the IAG. The IAG and client are in indirect communication via the server. The client is operative to request an enterprise application token from the IAG using a dataset comprising a device identifier and a user identifier, without concurrently prompting a user for the dataset. The IAG is operative to prepare a token in response to the request, and push the token to an e-mail address associated with the telecommunications device via the server's push proxy gateway. The client is operative to employ the token in communications addressed to an enterprise application via the server and the IAG. The IAG is operative to replace the token in each communication with identification information called for by the enterprise application.

18 Claims, 15 Drawing Sheets

Split Token

(56) References Cited

U.S. PATENT DOCUMENTS

| | | | |
|---|---|---|---|
| 2008/0046715 A1* | 2/2008 | Balazs et al. | 713/152 |
| 2008/0209538 A1* | 8/2008 | Malakapalli et al. | 726/12 |
| 2009/0133107 A1* | 5/2009 | Thoursie | 726/6 |
| 2009/0259757 A1 | 10/2009 | Ben-Shachar et al. | |
| 2009/0271847 A1* | 10/2009 | Karjala et al. | 726/6 |
| 2010/0306547 A1* | 12/2010 | Fallows et al. | 713/178 |

OTHER PUBLICATIONS

WebSeal Single Sign-On with Telecom WAP 2.0/GPRS/3G gateways. http://www.ibm.com/developerworks/tivoli/library/t-ssotele/index.html . Retrieved Jul. 19, 2007.

3. UBISECURE Ubilogin Single Sign-On. Retrieved Jan. 20, 2012.

Office Action mailed Aug. 27, 2012, in corresponding Canadian patent application No. 2,720,720.

* cited by examiner

Figure 12 – High Capacity Logical Overview

Figure 13 – Split Token

USING A TRUSTED TOKEN AND PUSH FOR VALIDATING THE REQUEST FOR SINGLE SIGN ON

CROSS REFERENCE TO RELATED APPLICATIONS

This application claims the benefit of U.S. Provisional Patent Application No. 61/260,353, filed Nov. 11, 2009. U.S. Provisional Patent Application No. 61/260,353 is fully incorporated by reference herein.

FIELD OF THE TECHNOLOGY

The technology disclosed herein relates to identity management in the context of mobile communication devices providing access to access-controlled enterprise resources.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

Typical enterprise applications require a user to enter username and password when the enterprise application is accessed from a mobile device, typically because the device itself is not enabled to provide sufficient authentication. Entering username/password can be cumbersome, is error prone, and is time-consuming.

Some implementations of the present technology can provide for the client to request a token by sending its device identifier (e.g., a Blackberry® PIN—a number that uniquely identifies BlackBerry devices and BlackBerry enabled devices on the wireless network) and Email address to an intermediate application gateway (IAG). The IAG can validate the PIN/Email via the device server database. After a token is generated and associated with a given PIN/Email pair, the IAG can push the token to the device using the Email address or the PIN. This step guarantees that only the device associated with the Email address can be able to receive a valid token. Subsequent application data can use the token to identify the user of the application requests. To reduce the likelihood of malicious requests that can result in denial-of-service attacks, a transaction ID can be sent on each token request and matched when this is received, otherwise the client can ignore unsolicited token responses/push. The IAG can inject valid PIN and E-mails into the HTTP headers in order to provide identity data, e.g. to an SSO gateway. Thus for an SSO configuration the use of username/password would not be necessary.

Figure 1:
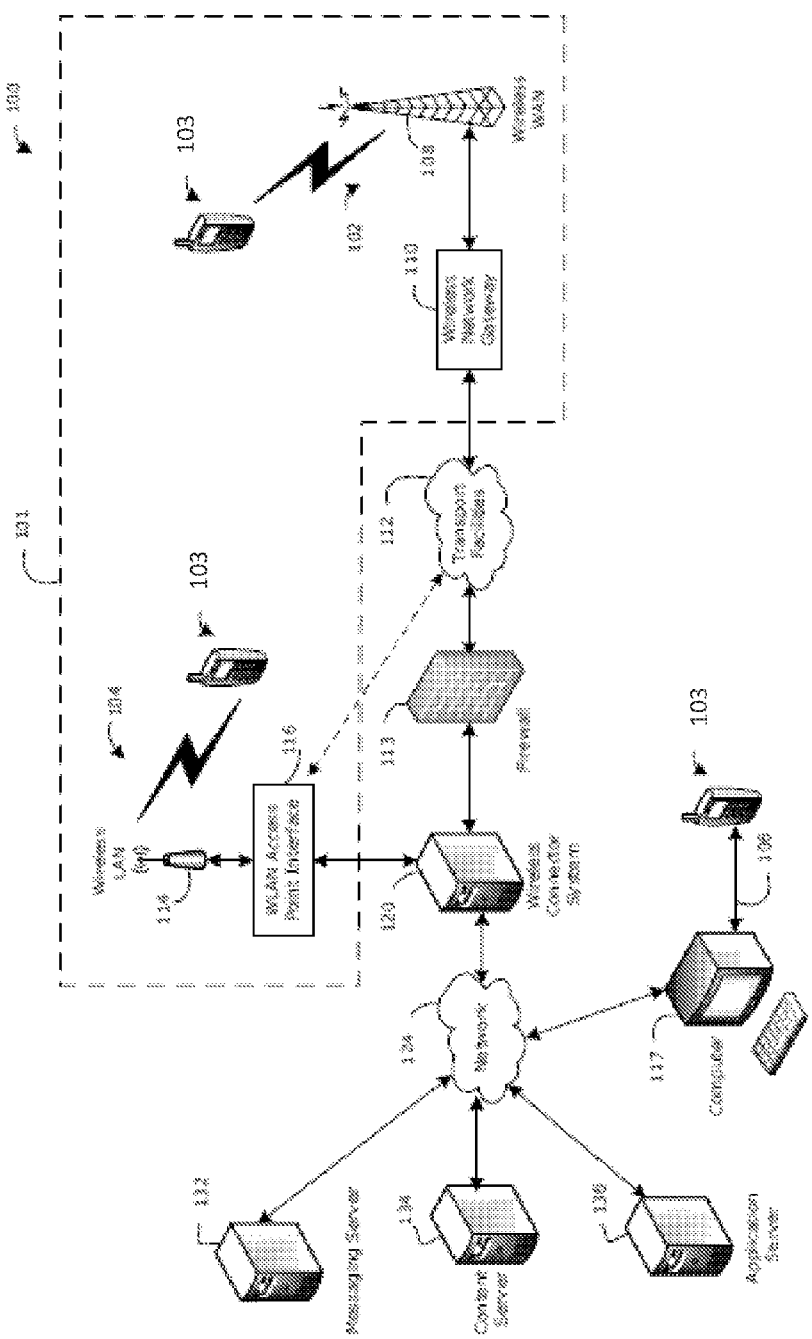
FIG. 1 illustrates a communication system including a mobile communication device to which system example implementations of the present disclosure can be applied.

In order to facilitate an understanding of one possible environment in which example implementations described herein can operate, reference is first made to FIG. 1 which shows in block diagram form a communication system 100 in which example implementations of the present disclosure can be applied. The communication system 100 comprises a number of mobile communication devices 103 (such as device 300 and the device of FIG. 5, FIG. 7, and FIG. 12) that can be connected to the remainder of system 100 in any of several different ways. Accordingly, several instances of mobile communication devices 103 are depicted in FIG. 1 employing different example ways of connecting to system 100. Mobile communication devices 103 are connected to a wireless network 101 that can comprise one or more of a Wireless Wide Area Network (WWAN) 102 and a Wireless Local Area Network (WLAN) 104 or other suitable network arrangements. In some implementations, the mobile communication devices 103 are configured to communicate over both the WWAN 102 and WLAN 104, and to roam between these networks. In some implementations, the wireless network 101 can comprise multiple WWANs 102 and WLANs 104.

The WWAN 102 can be implemented as any suitable wireless access network technology. By way of example, but not limitation, the WWAN 102 can be implemented as a wireless network that includes a number of transceiver base stations 108 (one of which is shown in FIG. 1, and such as 419) where each of the base stations 108 provides wireless Radio Frequency (RF) coverage to a corresponding area or cell. The WWAN 102 is typically operated by a mobile network service provider that provides subscription packages to users of the mobile communication devices 103. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

Figure 5:
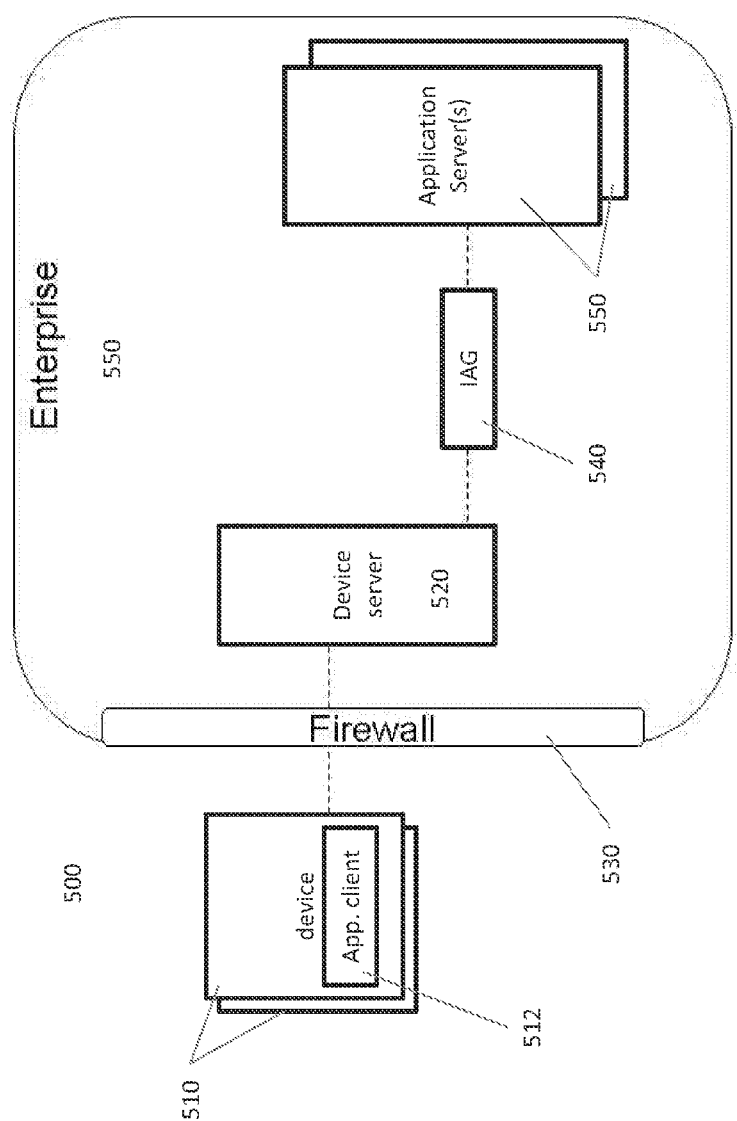
FIG. 5 illustrates a logical view of components and subsystems of some implementations of the technology in an enterprise architecture.
Figure 7:
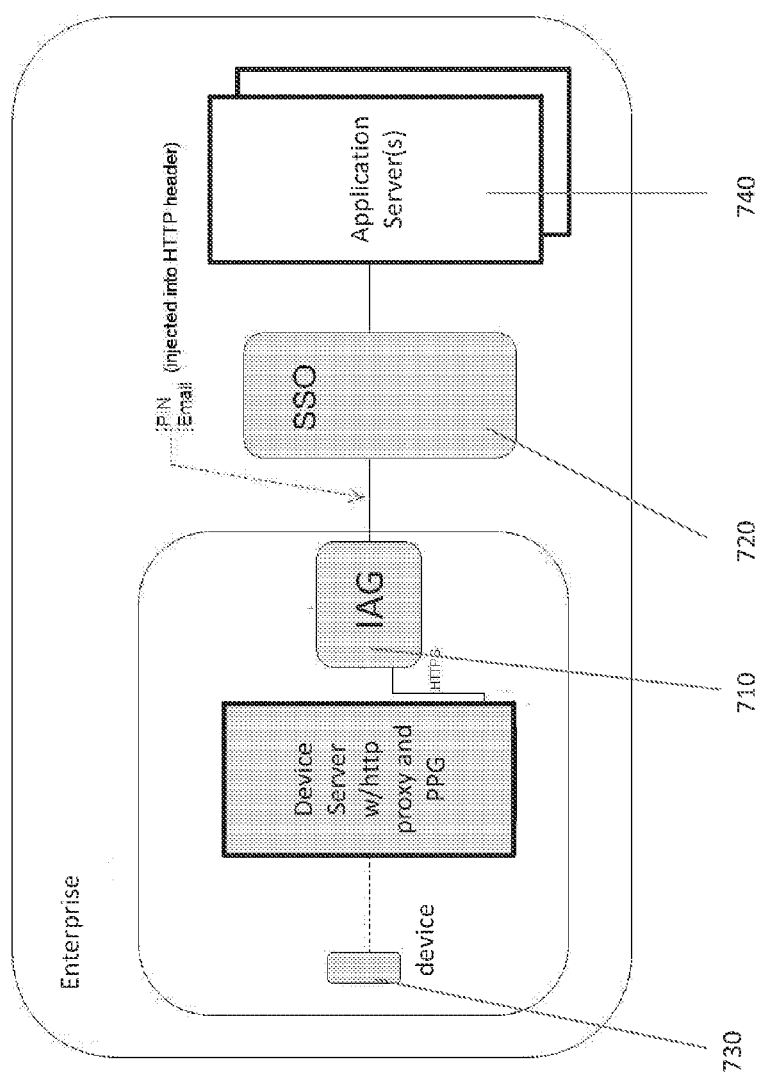
FIG. 7 illustrates an example setup for integrating an Intermediate Application Gateway (IAG) into a Single Sign On (SSO) product.
Figure 12:
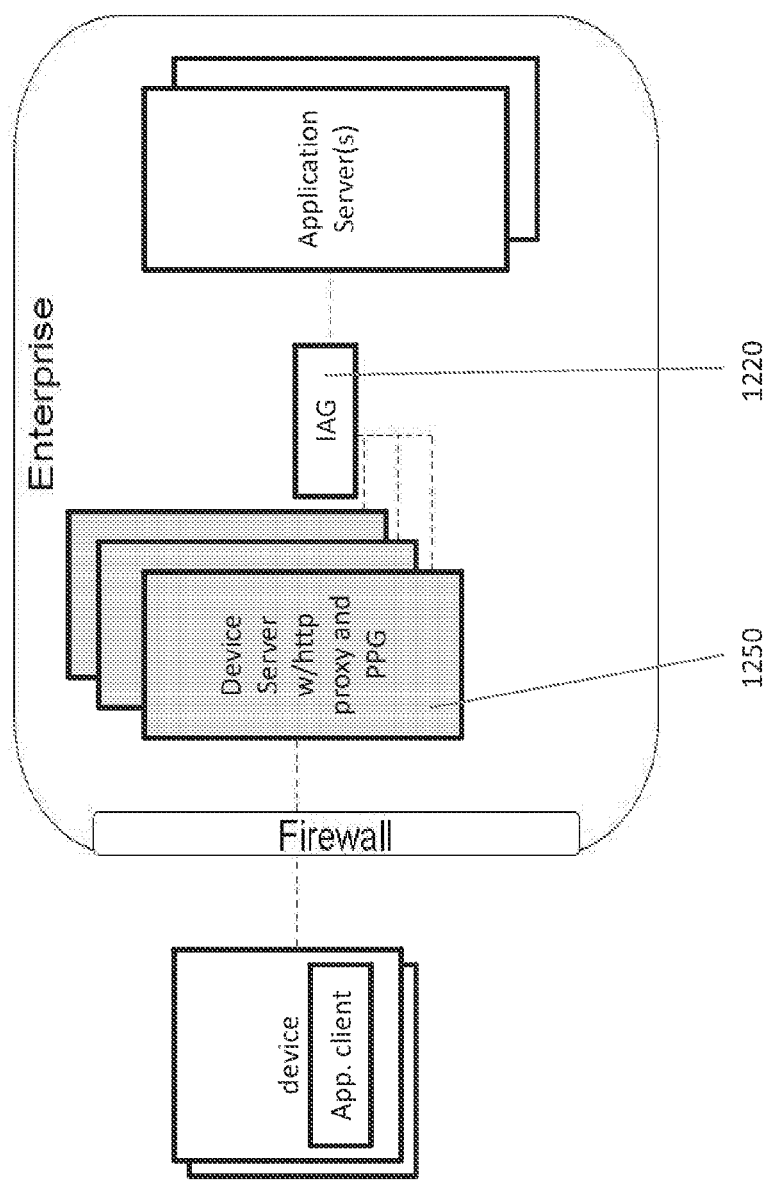
FIG. 12 illustrates how an architecture of the technology can support scaling.

The WWAN 102 further can comprise a wireless network gateway 110 which connects the mobile communication devices 103 to transport facilities 112, and through the transport facilities 112 to a wireless connector system 120 (such as device server of FIG. 5, FIG. 7, and FIG. 12). Transport facilities can include one or more private networks or lines, the public internet, a virtual private network, or any other suitable network. The wireless connector system 120 can be operated, for example, by an organization or enterprise such as a corporation, university, or governmental department, which allows access to a network 124 such as an internal or enterprise network and its resources, or the wireless connector system 120 can be operated by a mobile network provider. In some implementations, the network 124 can be realized using the internet rather than or in addition to an internal or enterprise network.

The wireless network gateway 110 provides an interface between the wireless connector system 120 and the WWAN 102, which facilitates communication between the mobile communication devices 103 and other devices (not shown) connected, directly or indirectly, to the WWAN 102. Accordingly, communications sent via the mobile communication devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 103.

The WLAN 104 comprises a wireless network which, in some implementations, conforms to IEEE 802.11x standards (sometimes referred to as Wi-Fi™) such as, for example, the IEEE 802.11a, 802.11b and/or 802.11g standard. Other communication protocols can be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 can be a personal network of the user, an enterprise network, or a hotspot offered by an internet service provider (ISP), a mobile network provider, or a property owner in a public or semi-public area, for example. The access points 114 are connected to an access point (AP) interface 116 that can connect to the wireless connector system 120 directly (for example, if the access point 114 is part of an enterprise WLAN 104 in which the wireless connector system 120 resides), or indirectly as indicated by the dashed line in FIG. 1 via the transport facilities 112 if the access point 114 is a personal Wi-Fi network or Wi-Fi hotspot (in which case a mechanism for securely connecting to the wireless connector system 120, such as a virtual private network (VPN), can be used). The AP interface 116 provides translation and routing services between the access points 114 and the wireless connector system 120 to facilitate communication, directly or indirectly, with the wireless connector system 120.

The wireless connector system 120 can be implemented as one or more servers, and is typically located behind a firewall 113 (such as firewall of FIG. 5 and FIG. 12). The wireless connector system 120 manages communications, including email communications, to and from a set of managed mobile communication devices 103. The wireless connector system 120 also provides administrative control and management capabilities over users and mobile communication devices 103 then can connect to the wireless connector system 120.

The wireless connector system 120 allows the mobile communication devices 103 to access the network 124 and connected resources and services such as a messaging server 132 (for example, a Microsoft Exchange, IBM Lotus Domino, or Novell GroupWise email server), a content server 134 for providing content such as internet content or content from an organization's internal servers, and application servers 136 (such as application server of FIG. 5 and FIG. 12) for implementing server-based applications such as instant messaging (IM) applications to mobile communication devices 103.

The wireless connector system 120 typically provides a secure exchange of data (e.g., email messages, personal information manager (PIM) data, and IM data) with the mobile communication devices 103. In some implementations, communications between the wireless connector system 120 and the mobile communication devices 103 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some implementations, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 which then transmit the data packets to the destination mobile communication device 103. The AP interfaces 116 of the WLAN 104 provide similar sending functions between the mobile communication device 103, the wireless connector system 120 and network connection point such as the messaging server 132, content server 134 and application server 136.

The network 124 can comprise a private local area network, metropolitan area network, wide area network, the public internet or combinations thereof and can include virtual networks constructed using any of these, alone, or in combination. A mobile communication device 103 alternatively can connect to the wireless connector system 120 using a computer 117, such as desktop or notebook computer, via the network 124. A link 106 can be provided for exchanging information between the mobile communication device 103 and a computer 117 connected to the wireless connector system 120. The link 106 can comprise one or both of a physical interface and short-range wireless communication interface. The physical interface can comprise one or combinations of an Ethernet connection, Universal Serial Bus (USB) connection, Firewire™ (also known as an IEEE 1394 interface) connection, or other serial data connection, via respective ports or interfaces of the mobile communication device 103 and computer 117. The short-range wireless communication interface can be a personal area network (PAN) interface. A Personal Area Network is a wireless point-to-point connection meaning no physical cables are used to connect the two end points. The short-range wireless communication interface can comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3 a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 103. Suitable variations of the communication system will be understood to a person of skill in the art and are intended to fall within the scope of the present disclosure.

In example implementations, the mobile communication device 103 is a two-way communication device having at least data and possibly also voice communication capabilities, and the capability to communicate with other computer systems, for example, via the public internet. Depending on the functionality provided by the mobile communication device 103, in various implementations the device can be, by way of example but not limitation, a data communication device, a multiple-mode communication device configured for both data and voice communication, a mobile telephone, a PDA (personal digital assistant) enabled for wireless communication, a smart phone, or a laptop computer with a wireless modem.

In some implementations, the mobile communication device 103 is a handheld electronic device which includes a rigid case (not shown) for housing components of the device 103 and is configured to be held with one or two hands while the device 103 is in use. In some implementations, the handheld electronic device is small enough to fit inside a purse or coat pocket or belt mounted holster.

Figure 2:
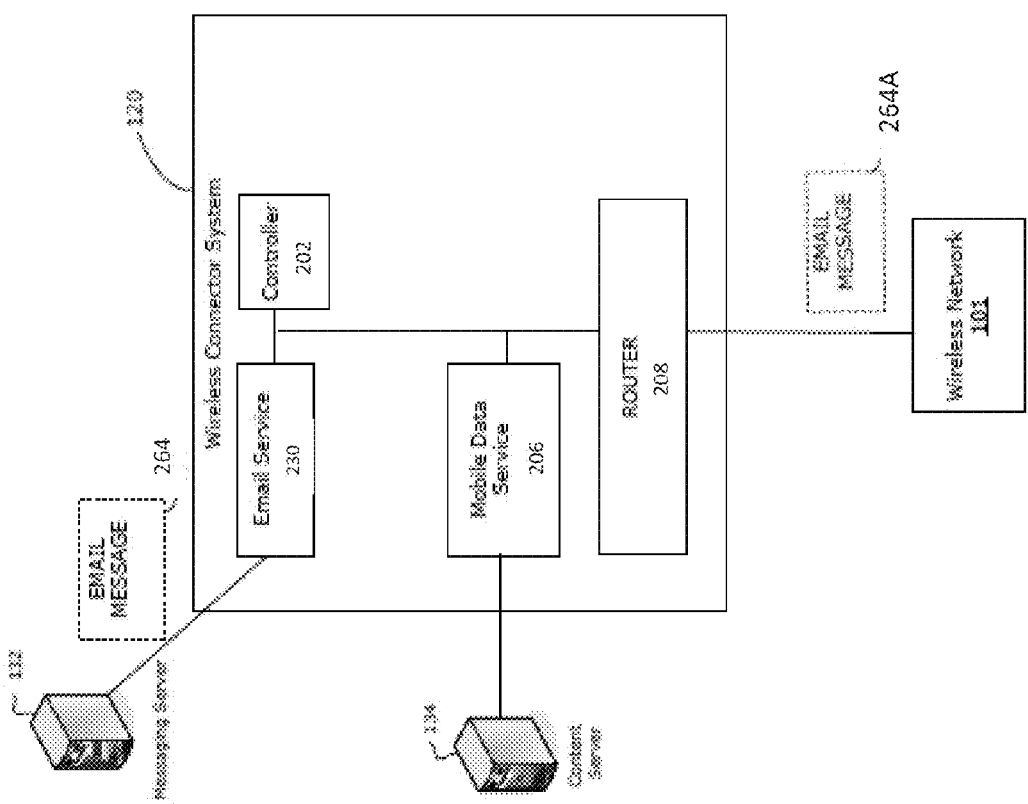
FIG. 2 illustrates a wireless connector system in accordance with one implementation of the present disclosure.

Referring now to FIG. 2, the wireless connector system 120 for use in accordance with one implementation of the present disclosure will now be described in more detail. The wireless connector system 120 can be implemented using any known general purpose computer technology, and can, for example be realized as one or more microprocessor-based server computers implementing one or more server applications configured for performing the processes and functions described herein. The wireless connector system 120 is configured to implement a number of components or modules, including by way of non-limiting example, a controller 202, a mobile data service 206, a router 208 and an email service 230. The wireless connector system can include more of or fewer than the modules listed above. In one example implementation, the wireless connector system 120 includes one or more microprocessors that operate under stored program control and execute software to implement these modules. The software can for example be stored in memory such as persistent memory.

Controller 202 monitors the various components or modules of the wireless connector system and restarts them if they stop working. The mobile data service 206 enables mobile communication devices 103 to access content available through content server 134, such as, but not limited to, web content, the internet, and an organization's intranet and content servers. Router 208 connects to the wireless network 101 to send data to and from mobile communication devices 103. Email service 230 connects to messaging server 132 to provide messaging services, including processing message attachments that are sent to mobile communication devices 103.

The controller 202, email service 230, mobile data service 206, and router 208 modules can, among other things, each be implemented through stand-alone software applications, or combined together in one or more software applications, or as part of another software application. In some implementations, the functions performed by each of the above identified modules can be realized as a plurality of independent elements, rather than a single integrated element, and any one or more of these elements can be implemented as parts of other software applications.

Together with the other modules described above, the email service 230 configures the wireless connector system 120 to perform, at least in part, the functions of a mobile email server and in this regard the wireless connector system 120 receives email messages 264 from messaging server 132, processes the received email messages for sending to mobile communication devices 103 in wireless network 101, and then sends the processed email messages 264A to the recipient devices 103.

Figure 3:
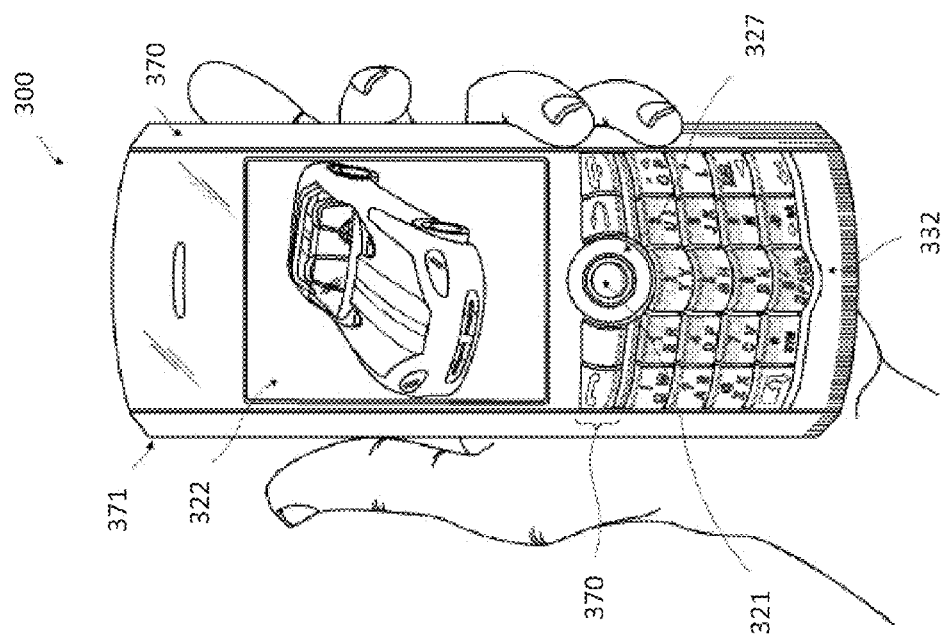
FIG. 3 illustrates an exemplary communication device used in implementations of the present technology.
Figure 4:
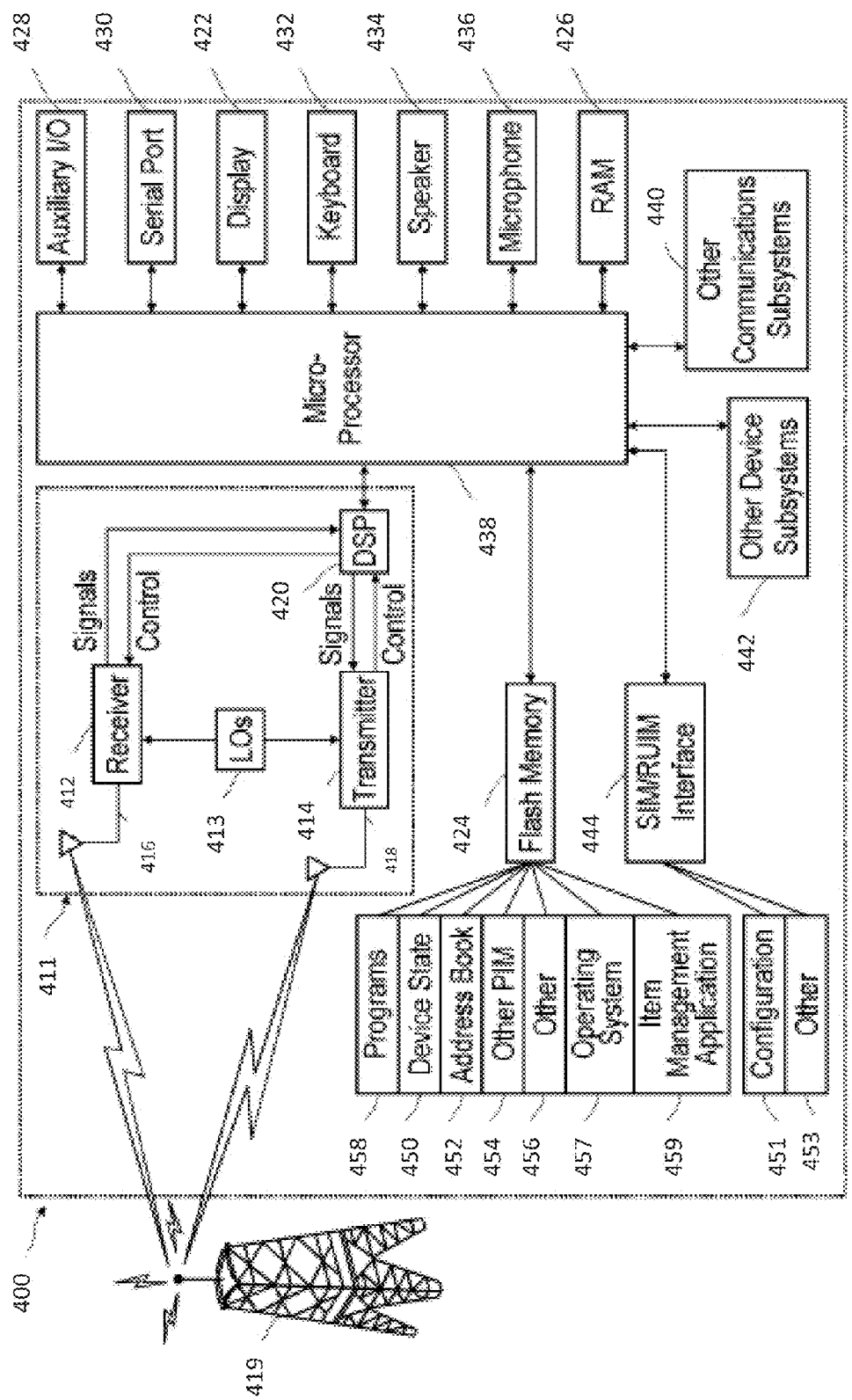
FIG. 4 illustrates a device, such as in FIG. 3, in detail.

As shown in FIG. 3, the exemplary communication devices 300 are communicatively coupled to a wireless network 319 as exemplified in the block diagram of FIG. 4. These figures are exemplary only, and those persons skilled in the art will appreciate that additional elements and modifications may be necessary to make the communication device 300 work in particular network environments. While in the illustrated implementations, the communication devices 300 are smart phones, however, in other implementations, the communication devices 300 can be personal digital assistants (PDA), laptop computers, desktop computers, servers, or other communication device capable of sending and receiving electronic messages.

Referring to FIG. 4, a block diagram of a communication device in accordance with an exemplary implementation is illustrated. As shown, the communication device 400, such as 300, includes a microprocessor 438 that controls the operation of the communication device 400. A communication subsystem 411 performs all communication transmission and reception with the wireless network 419. The microprocessor 438 further can be communicatively coupled with an auxiliary input/output (I/O) subsystem 428 which can be communicatively coupled to the communication device 400. Additionally, in at least one implementation, the microprocessor 438 can be communicatively coupled to a serial port (for example, a Universal Serial Bus port) 430 which can allow for communication with other devices or systems via the serial port 430. A display 322, 422 can be communicatively coupled to microprocessor 438 to allow for displaying of information to an operator of the communication device 400. When the communication device 400 is equipped with a keyboard 432, the keyboard can also be communicatively coupled with the microprocessor 438. The communication device 400 can include a speaker 434, a microphone, 436, random access memory (RAM), and flash memory 424 all of which can be communicatively coupled to the microprocessor 438. Other similar components can be provided on the communication device 400 as well and optionally communicatively coupled to the microprocessor 438. Other communication subsystems 440 and other communication device subsystems 442 are generally indicated as being functionally connected with the microprocessor 438 as well. An example of a communication subsystem 440 is that of a short range communication system such as BLUETOOTH® communication module or a WI-FI® communication module (a communication module in compliance with IEEE 802.11 b) and associated circuits and components. Additionally, the microprocessor 438 is able to perform operating system functions and enables execution of programs on the communication device 400. In some implementations not all of the above components can be included in the communication device 400. For example, in at least one implementation the keyboard 432 is not provided as a separate component and is instead integrated with a touchscreen as described below.

The auxiliary I/O subsystem 428 can take the form of a variety of different navigation tools (multi-directional or single-directional) such as a trackball navigation tool 421 as illustrated in the exemplary implementation shown in FIG. 3, or a thumbwheel, a navigation pad, a joystick, touch-sensitive interface, or other I/O interface. These navigation tools can be located on the front surface of the communication device 400 or can be located on any exterior surface of the communication device 400. Other auxiliary I/O subsystems can include external display devices and externally connected keyboards (not shown). While the above examples have been provided in relation to the auxiliary I/O subsystem 428, other subsystems capable of providing input or receiving output from the communication device 400 are considered within the scope of this disclosure. Additionally, other keys can be placed along the side of the communication device 300 to function as escape keys, volume control keys, scrolling keys, power switches, or user programmable keys, and likewise can be programmed accordingly.

As can be appreciated from FIG. 3, the communication device 400 comprises a lighted display 322 located above a keyboard 432 constituting a user input and suitable for accommodating textual input to the communication device 400. The front face 370 of the communication device 300 has a navigation row 370. As shown, the communication device 300 is of unibody construction, also known as a "candy-bar" design.

The communication device 400 can include an auxiliary input that acts as a cursor navigation tool 327 and which can be also exteriorly located upon the front face 370 of the communication device 300. Its front face location allows the tool to be easily thumb-actuable like the keys of the keyboard 432. An implementation provides the navigation tool 327 in the form of a trackball 421 which can be utilized to instruct two-dimensional screen cursor movement in substantially any direction, as well as act as an actuator when the trackball 421 is depressed like a button. The placement of the navigation tool 327 can be above the keyboard 432 and below the display screen 322; here, it can avoid interference during keyboarding and does not block the operator's view of the display screen 322 during use, e.g., as shown in FIG. 3.

As illustrated in FIG. 3, the communication device 300 can be configured to send and receive messages. The communication device 300 includes a body 371 that, in some implementations, can be configured to be held in one hand by an operator of the communication device 300 during text entry.

A display 322 is included which is located on a front face 370 of the body 371 and upon which information is displayed to the operator during text entry. The communication device 300 also can be configured to send and receive voice communications such as mobile telephone calls. The communication device 300 also can include a camera (not shown) to allow the user to take electronic photographs which can be referred to as photos or pictures.

Furthermore, the communication device 400 is equipped with components to enable operation of various programs, as shown in FIG. 4. In an exemplary implementation, the flash memory 424 is enabled to provide a storage location for the operating system 457, device programs 458, and data. The operating system 457 is generally configured to manage other programs 458 that are also stored in memory 424 and executable on the processor 438. The operating system 457 honors requests for services made by programs 458 through predefined program 458 interfaces. More specifically, the operating system 457 typically determines the order in which multiple programs 458 are executed on the processor 438 and the execution time allotted for each program 458, manages the sharing of memory 424 among multiple programs 458, handles input and output to and from other device subsystems 442, and so on. In addition, operators can typically interact directly with the operating system 457 through a user interface usually including the keyboard 432 and display screen 322. While in an exemplary implementation the operating system 457 is stored in flash memory 424, the operating system 457 in other implementations is stored in read-only memory (ROM) or similar storage element (not shown). As those skilled in the art will appreciate, the operating system 457, device program 458 or parts thereof can be loaded in RAM 426 or other volatile memory.

When the communication device 400 is enabled for two-way communication within the wireless communication network 419, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 400 can use a unique identifier to enable the communication device 400 to transmit and receive signals from the communication network 419. Other systems may not use such identifying information. GPRS, UMTS, and EDGE use a Subscriber Identity Module (SIM) in order to allow communication with the communication network 419. Likewise, most CDMA systems use a Removable Identity Module (RUIM) in order to communicate with the CDMA network. The RUIM and SIM card can be used in multiple different communication devices 400. The communication device 400 can operate some features without a SIM/RUIM card, but it will not be able to communicate with the network 419. A SIM/RUIM interface 444 located within the communication device 300 allows for removal or insertion of a SIM/RUIM card (not shown). The SIM/RUIM card features memory and holds key configurations 451, and other information 453 such as identification and subscriber related information. With a properly enabled communication device 400, two-way communication between the communication device 400 and communication network 419 is possible.

If the communication device 400 is enabled as described above or the communication network 419 does not use such enablement, the two-way communication enabled communication device 400 is able to both transmit and receive information from the communication network 419. The transfer of communication can be from the communication device 400 or to the communication device 400. In order to communicate with the communication network 419, the communication device 400 in the presently described exemplary implementation is equipped with an integral or internal antenna 418 for transmitting signals to the communication network 419. Likewise the communication device 400 in the presently described exemplary implementation is equipped with another antenna 416 for receiving communication from the communication network 419. These antennae (416, 418) in another exemplary implementation are combined into a single antenna (not shown). As one skilled in the art can appreciate, the antenna or antennae (416, 418) in another implementation are externally mounted on the communication device 400.

When equipped for two-way communication, the communication device 400 features a communication subsystem 411. As is understood in the art, this communication subsystem 411 is modified so that it can support the operational needs of the communication device 400. The subsystem 411 includes a transmitter 414 and receiver 412 including the associated antenna or antennae (416, 418) as described above, local oscillators (LOs) 413, and a processing module 420 which in the presently described exemplary implementation is a digital signal processor (DSP) 420.

It is contemplated that communication by the communication device 400 with the wireless network 419 can be any type of communication that both the wireless network 419 and communication device 400 are enabled to transmit, receive and process. In general, these can be classified as voice and data. Voice communication generally refers to communication in which signals for audible sounds are transmitted by the communication device 400 through the communication network 419. Data generally refers to all other types of communication that the communication device 400 is capable of performing within the constraints of the wireless network 419.

Example device programs that can depend on such data include email, contacts and calendars. For each such program synchronization with home-based versions on the programs can be desirable for either or both of their long term and short term utility. As an example, emails are often time sensitive, so substantially real time (or near-real time) synchronization may be desired. Contacts, on the other hand, can be usually updated less frequently without inconvenience. Therefore, the utility of the communication device 400 is enhanced when connectable within a communication system, and when connectable on a wireless basis in a network 419 in which voice, text messaging, and other data transfer are accommodated.

The keyboard 432 can include a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 322, which in one implementation is enabled by touching the display screen 322, for example, with a stylus, finger, or other pointer, to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one implementation, physical and virtual keys are combined such that the plurality of enabled keys for a particular program or feature of the communication device 300 is shown on the display screen 322 in the same configuration as the physical keys. Using this configuration, the operator can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

In at least one implementation, a communication device 300 that is configured to send and receive email messages comprises a body 371 configured to be held in a text entry orientation by an operator or user. (For example see FIG. 3). The body 371 of the communication device 300 has a front face 370 at which a display screen 322 is located and upon which information is displayed to the operator of the communication device 300 in the text entry orientation. The communication device 300 further comprises a microprocessor configured to run programs on the communication device 300 and to receive operator commands from user inputs, such as a keyboard 432 and trackball 421, located on the communication device 300.

While the above description generally describes the systems and components associated with a handheld communication device, the communication device 300 could be another communication device such as a PDA, a laptop computer, desktop computer, a server, or other communication device. In those implementations, different components of the above system might be omitted in order provide the desired communication device 300. Additionally, other components not described above can be used to allow the communication device 300 to function in a desired fashion. The above description provides only general components and additional components can be used to enable the system to function. These systems and components can be appreciated by those of ordinary skill in the art.

Referring to FIG. 5, a logical view of components and subsystems of some implementations of the present technology in the context of an enterprise architecture is shown. Multiple devices, each running an application client, can interface to a device server typically using lower-level protocols through a firewall. The device server can provide communications connectivity and protocol conversion to an intermediate application gateway (IAG) that can interface with one or more network application servers, in some cases through one or more proxies such as a Single Sign On (SSO) proxy. In some implementations, both the network application servers and proxies such as the SSO can be outside the enterprise.

Figure 6:
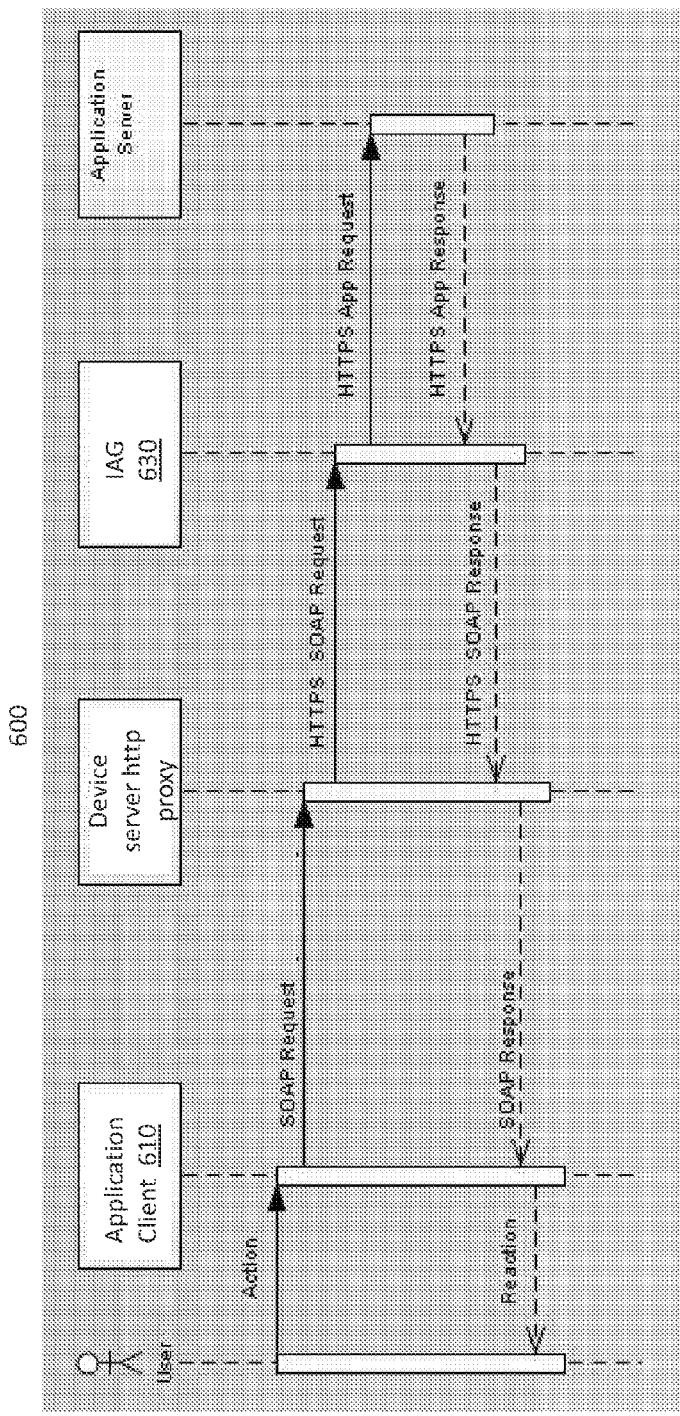
FIG. 6 illustrates message flow and protocols of some implementations of the technology.

Referring to FIG. 6, message flow and protocols used among the different tiers, when the interaction is initiated by a client are shown. The application client can be a JAVA 2 Micro Edition-based client. The Application Server can be a server such as an IBM Lotus Connections Server, a Microsoft Sharepoint server, or an SSO application such as CA Site-Minder or Tivoli Access Manager.

The client can obtain the URL of the IAG via the device/device server network; which can be defined for a given device server domain. In some implementations, one IAG URL can be defined per device server domain.

Referring to FIG. 7, in order to integrate an IAG to an SSO, such as SiteMinder access management or similar product, device information is provided by the IAG. In some implementations, the IAG can insert identification information, e.g., a device identifier (e.g., PIN, IP address, or phone number, etc.) and user identifier (e.g., Email address), into the HTTP headers of all application requests, as called for by the next destination (e.g., an SSO, or an application server), and then can send the application requests to the next destination. In order for the IAG to obtain and validate the PIN and Email for a device, the client can request a token and establishes a session with the IAG. The token can be, for example, a 256 bit string built using SHA1RNG algorithm with a random 32 bytes long string used for entropy.

Figure 8:
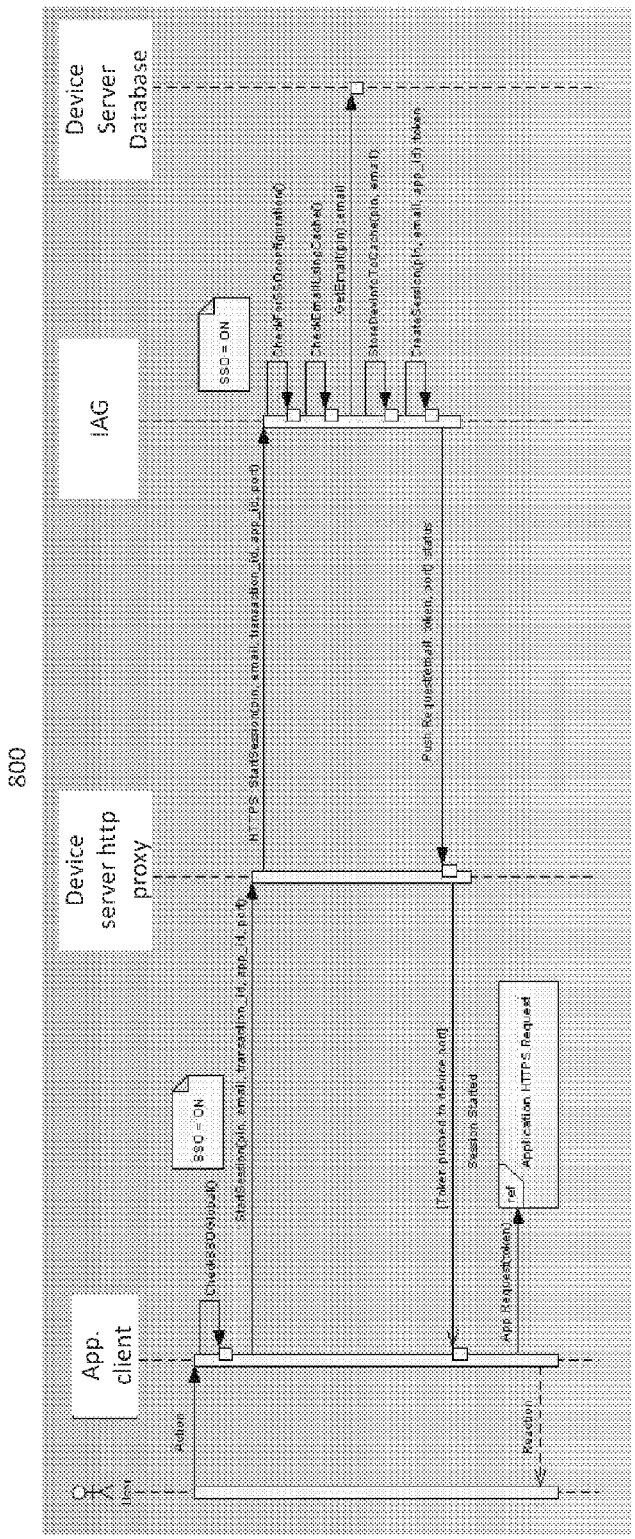
FIG. 8 illustrates a message diagram for some implementations of the technology.

FIG. 8 shows an exemplary message diagram for a token request. The use of HTTP headers to pass device information such as PIN/Email calls for an enterprise to setup the SSO environment to properly map the device to an enterprise user account, e.g., an Active Directory (AD) account or a device server database. An AD can manage user identifiers such as e-mail address, while the device server database can manage device identifiers. In other cases where a carrier may have a provisioning database managing IP addresses and phone numbers, any device swaps can be managed by IT within that SSO configuration.

In some implementations, the establishment of an SSO session can involve two-step authentication for each token request: 1) IAG verifies the PIN-EMAIL pair; 2) client verifies the receipt of an expected token.

In those implementations, the IAG can receive a token request from an unverified device PIN (a.k.a. un-trusted source). The IAG can perform a PIN to EMAIL lookup using a cache of the device server database to verify the PIN-EMAIL pair. A lookup against the device server database itself can be performed if the cache data is invalid or not present. In order to minimize device server database access, the IAG can maintain a cache with PIN and EMAIL data for all devices with the associated device server domain. The following strategy can be used. The cache can support EMAIL to PIN lookup. The cache can be initialized with all the device server domain EMAIL/PIN data at IAG startup. If an EMAIL/PIN is not found in the cache or does not match then a new DB lookup can be made and the cached can be updated. To reduce chances of denial-of-service attacks a maximum rate for these database lookups, e.g., one per second, can be set.

Once the PIN-EMAIL is verified then the IAG can continue, otherwise the IAG can reject the token request. The token prepared by the IAG can be sent to the client via a push technology network element, e.g., through a proxy gateway (PPG), a Short Message Service Center, using the device EMAIL and thus can provide that delivery of the token will be to the correct device. The client can validate the received token against a transaction_id, otherwise the client can ignores the pushed token. This step can mitigate the likelihood of a denial-of-service attack.

Figure 9:
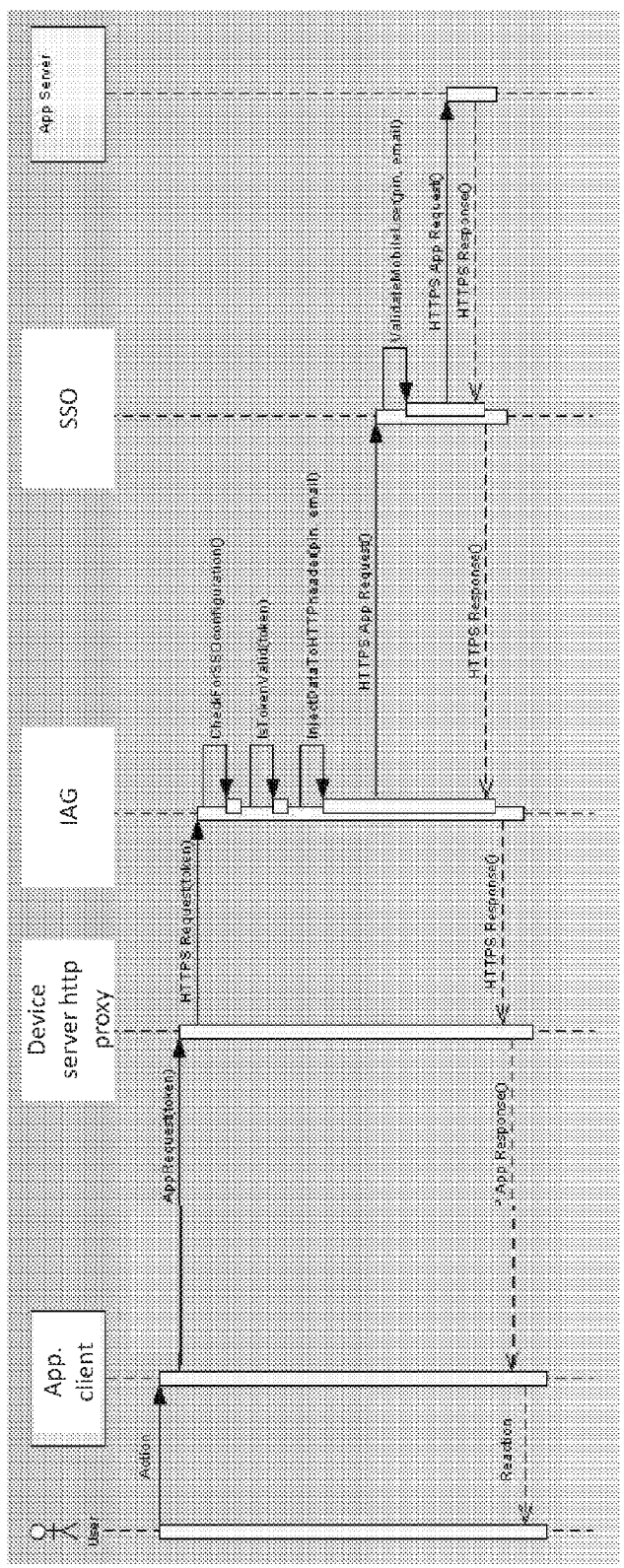
FIG. 9 illustrates an application HTTPS request of the technology.

Subsequent application requests that are sent via the HTTPS connection can include the token until it expires. When the session expires due to inactivity (the value can be configured in the IAG) the session can be re-established by the client. The IAG can use the token to validate the source of the request back to a specific device. The device can use various transport layer security (TLS) settings, e.g., "Handheld" or "Proxy", for the HTTPS connection to the IAG. Referring to FIG. 9, the client can send the session token in every application request until it is challenged by the IAG. A new token is then requested from the IAG.

Figure 10:
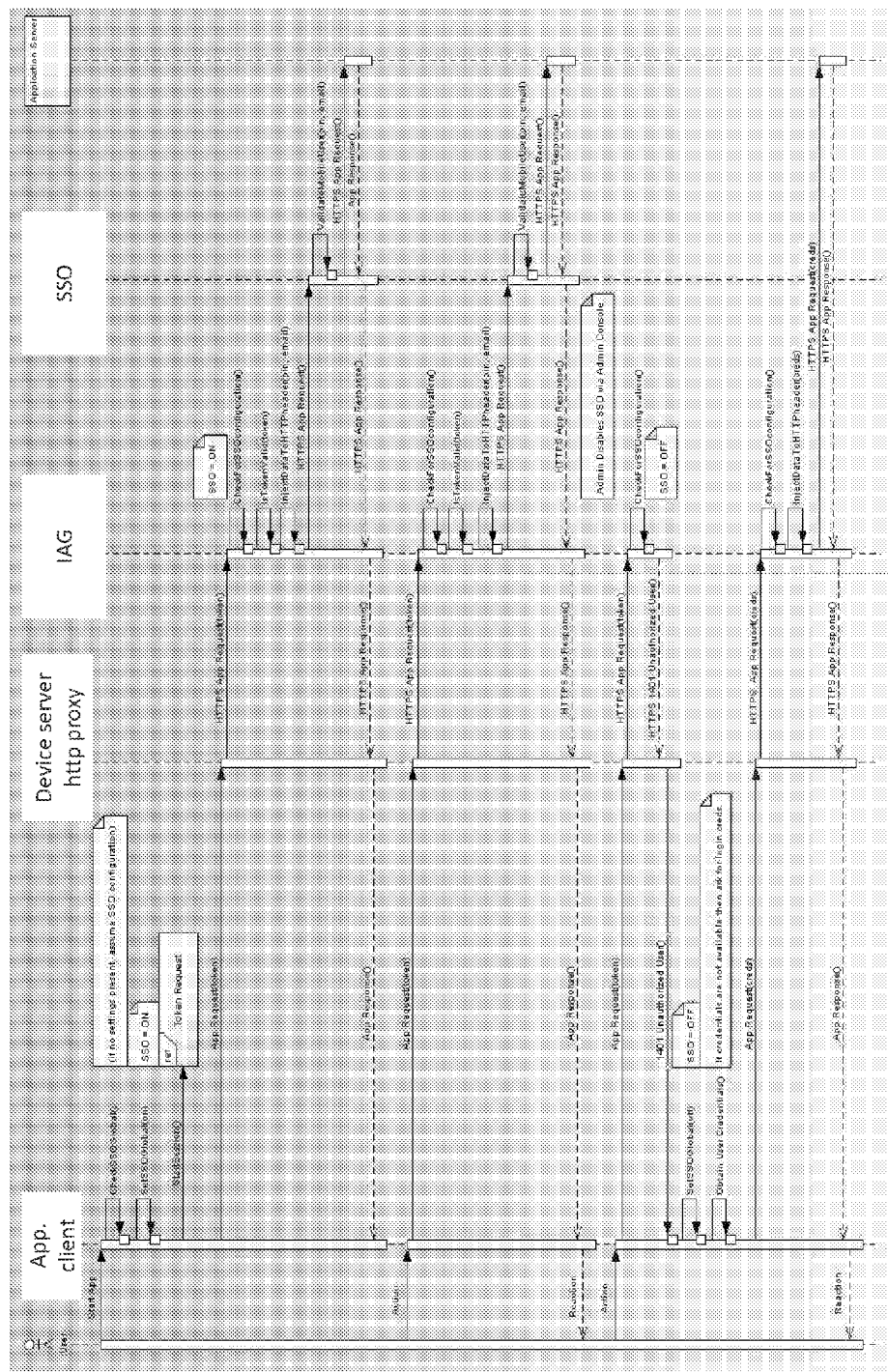
FIG. 10 illustrates client discovery of a switch to non-SSO status.

Referring to FIG. 10, the client can discover the IAG server configuration via HTTP result codes such as: (1) "HTTP 407" can be interpreted as a prompt to use a token, (2) "HTTP 1401" can be interpreted as a prompt for credentials or basic authentication. These challenges can be obtain during a token or an application request. On the first execution of the client, the client assumes that an SSO is available through the IAG. If the IAG is configured for non-SSO then an "HTTP 1401" challenge is made and the client stores this in persistent storage. FIG. 10 is an example of such a challenge.

Figure 11:
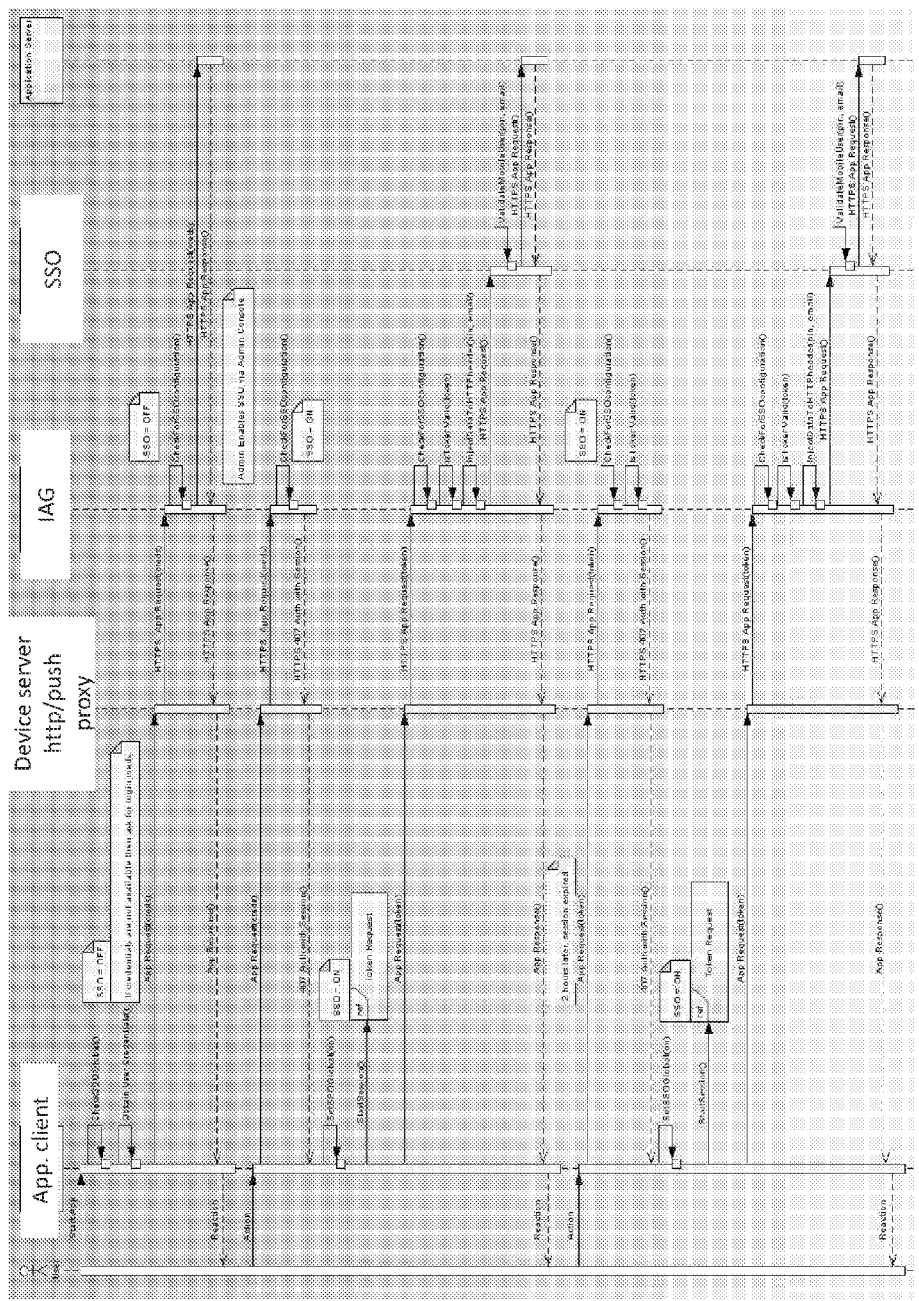
FIG. 11 illustrates client discovery of a switch to SSO status.

Referring to FIG. 11, the IAG can be enabled for SSO configuration. E.g., after an administrator enables SSO via an IAG admin console, then an "HTTP 407" challenge is made to any application request that are sent without a valid token. The client stores this configuration in persistent storage and proceeds to obtain a token. FIG. 11 is an example of such a challenge.

FIG. 12 illustrates how the architecture supports scaling by allowing many device servers, e.g., through HTTP and push proxies such as Mobile Data System Connection Service (MDSCS) to connect to the IAG. Since the IAG's concern is the Application Server(s) services, the IAG can process requests from any device server that can access it. When SSO is configured, the device server domain central push technology network element can be provided in order to distribute the tokens to the clients. In some implementations, the IAG can be a cluster of IAGs managed by a load balancer.

The device server can provide secure communication to intranet web servers and push services. This solution can leverage these services to extend the corporate user identity to SSO identity management providers and the respective application servers. The SSO session described above can provide that the token associated with a corporate user is only delivered and used by the legitimate requestor.

Figure 13:
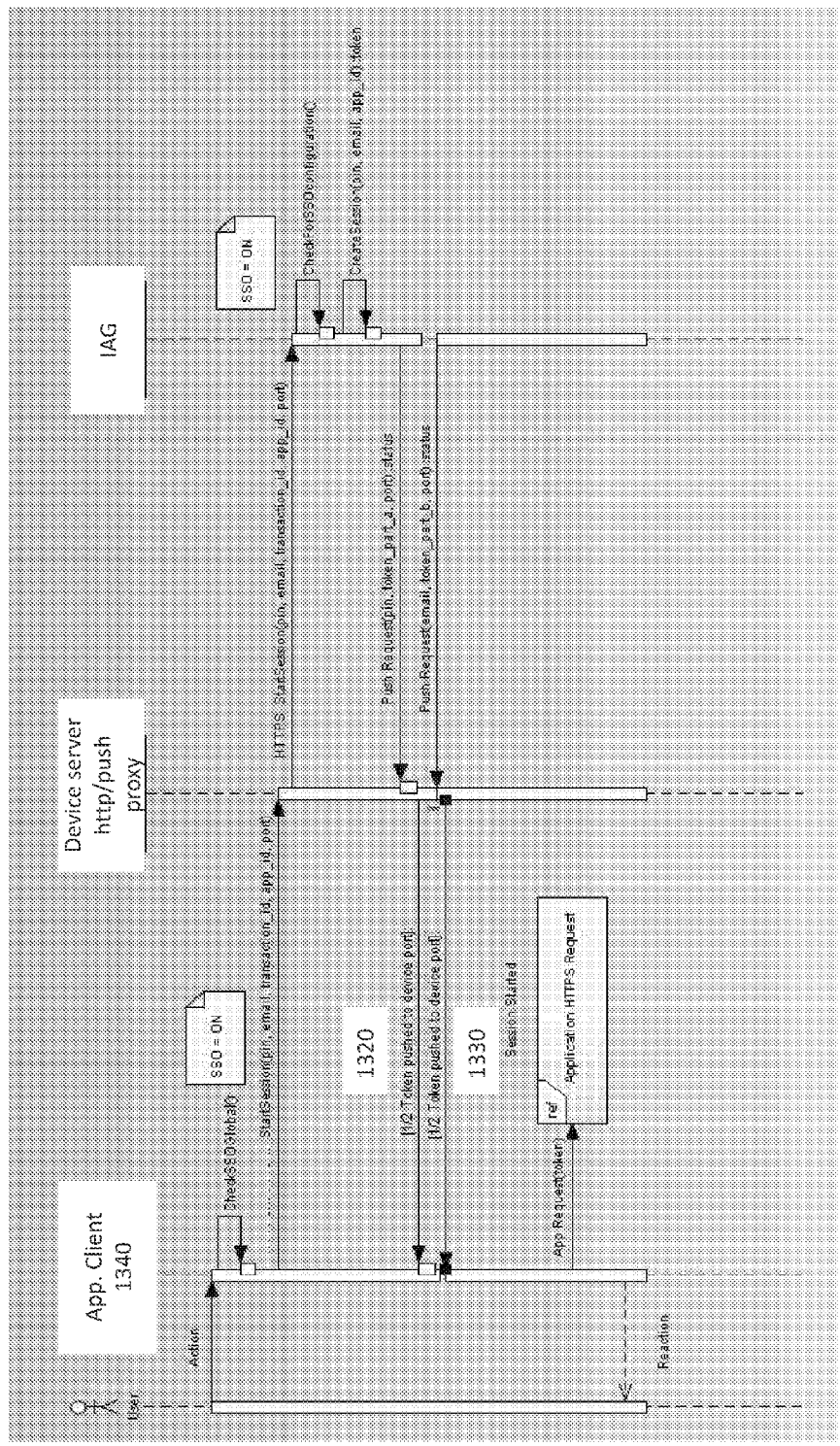
FIG. 13 illustrates implementations of the technology using a split token approach.

Referring to FIG. 13, in some implementations, the IAG can employ a split push of token portions. In these implementations, the IAG can push a first token portion based on a device identifier, e.g., PIN, phone number, IP address; and separately can push a second token portion based on a user identifier, e.g., e-mail address. In these implementations, access to the device server database is not required. The split nature of the token can ensure that only a device actually associated with the user will receive both portions of the token. Only a client associated with both the device identifier and the user identifier will receive both portions. The client can assemble the token from the token portions.

Figure 14:
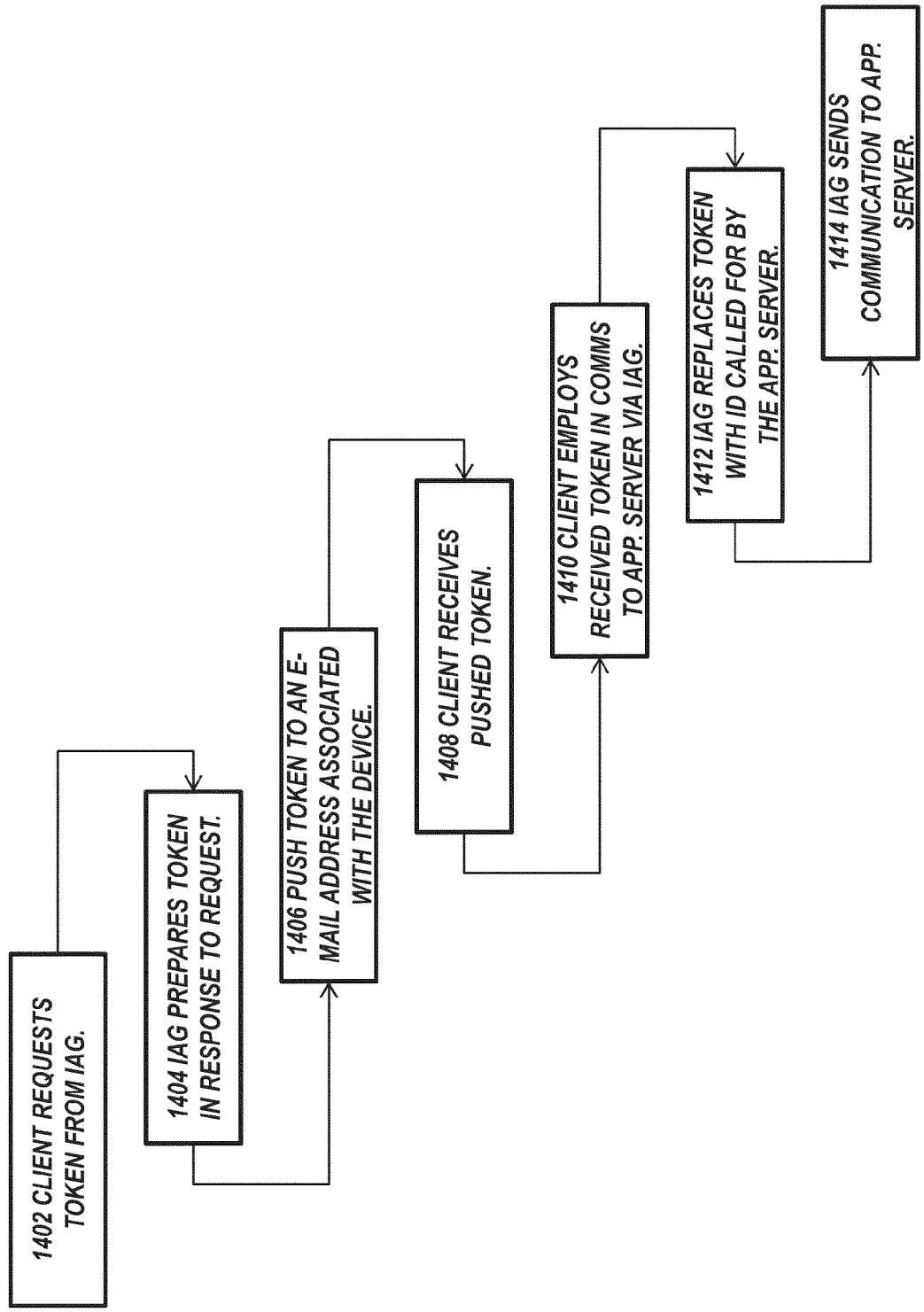
FIG. 14 illustrates methods of the technology.

Referring to FIG. 14, computer-implemented methods 1400 of the technology are illustrated. In those methods, a client can request 1402 an enterprise application token from an intermediate application gateway (IAG) using the dataset comprising a device identifier, a user identifier, or both a device identifier and a user identifier. The IAG can prepare 1404 an enterprise application token in response to the request, and can push 1406 the prepared token to an e-mail address associated with the telecommunications device via a push technology network element. The client can receive 1408 a pushed token; and can employ 1410 the pushed token in communications addressed to an enterprise application via the device server and the IAG. The IAG can replace 1412 the token in each communication with identification information called for by the enterprise application; and can send 1414 the communication with the identification information to the enterprise application.

In some implementations, the IAG can confirm an association between the device identifier and the user identifier included in the token request. In some implementations, the device identifier can comprise a PIN of the device, and the user identifier comprised an e-mail address. In some implementations, the device identifier can comprise a mobile phone number of the device, and the user identifier can comprise an e-mail address.

Figure 15:
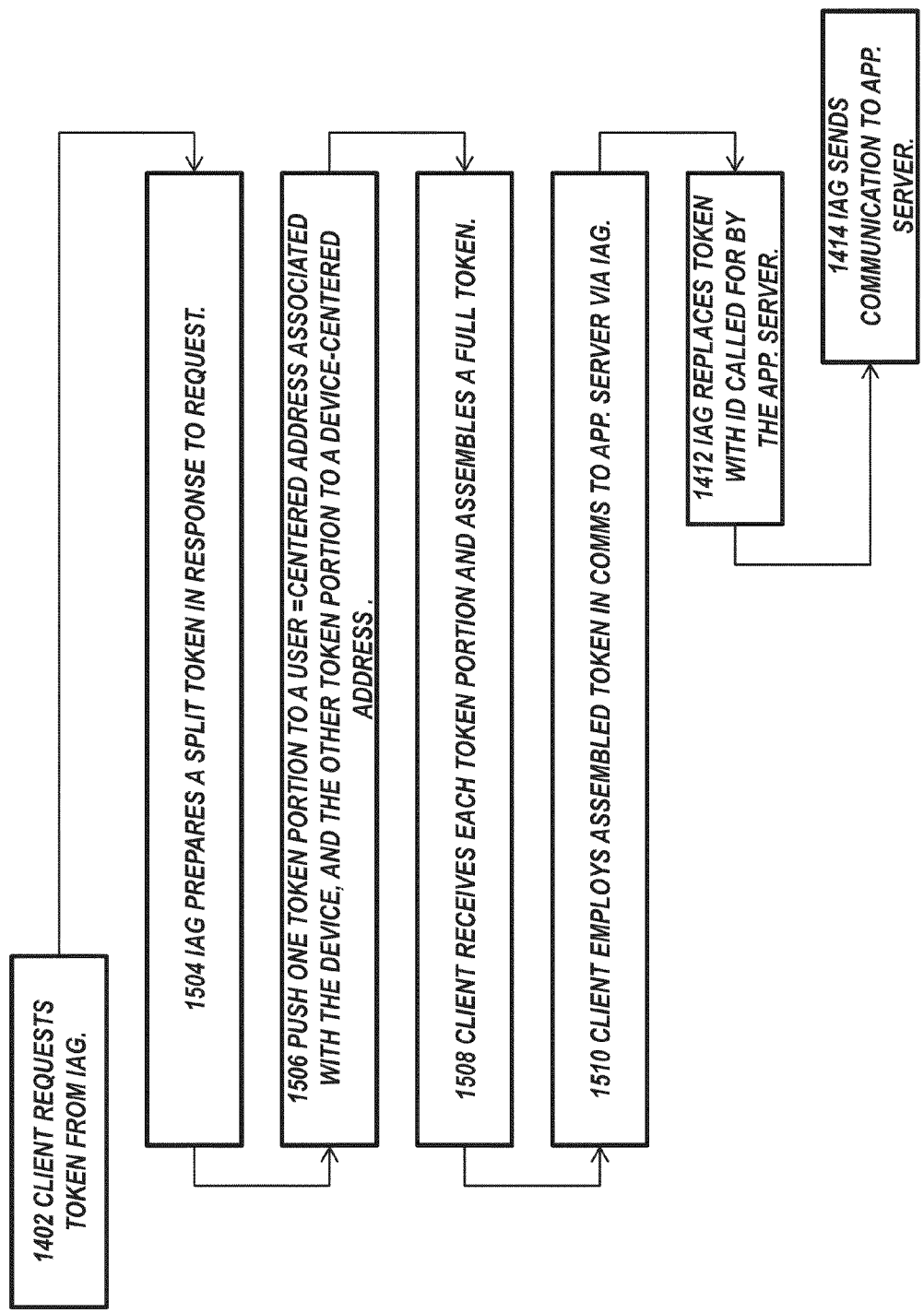
FIG. 15 illustrates methods of the technology.

Referring to FIG. 15, in some implementations the distributed computer-implemented method 1500 can include the steps described above (i.e., 1402, 1412, 1414), wherein preparing a token in response to the request comprises preparing a token first portion and preparing a token second portion 1504. In those implementations, pushing the prepared token can comprise pushing the token first portion of the prepared token to a user-centered address associated with the telecommunications device via the push proxy gateway, and pushing the token second portion of the prepared token to a device-centered address associated with the telecommunications device via the push proxy gateway 1508. In those embodiments the client is further operative to receive the first portion and second portion; and assemble the first portion and second portion into a token 1510. In some implementations the push technology network element comprises one of: a short message service center and a push proxy gateway.

The present technology can take the form of hardware, software or both hardware and software elements. In some implementations, the technology can be implemented in software, which includes but is not limited to firmware, resident software, microcode, an FPGA or ASIC, etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electromagnetic, infrared, or semiconductor system (or apparatus or device)) or transitory (e.g., a propagation medium). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product can include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters also can be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A distributed computer-implemented method for providing access to an enterprise application from a telecommunications device, the method comprising:
   in a client:
      requesting an enterprise application token from an intermediate application gateway (IAG) using a dataset comprising a device identifier, a user identifier, or both a device identifier and a user identifier;
   in an IAG:
      preparing an enterprise application token in response to the request,
      pushing a first portion of the prepared token to a user-centered address associated with the telecommunications device via a push technology network element;
      pushing a second portion of the prepared token to a device-centered address associated with the telecommunications device via the push technology network element;
   in the client:
      receiving the first portion of the prepared token and second portion of the prepared token;
      assembling the first portion and second portion into a token; and
      employing the assembled token in communications addressed to an enterprise application stored on one or more application servers via a device server and the IAG with the device server and the IAG interposed between the telecommunications device and the one or more application servers;
   in the IAG:
      replacing the employed token in each communication with identification information called for by the enterprise application; and
      sending the communication with the identification information to the enterprise application.

2. The distributed computer-implemented method of claim 1, further comprising:
   in the client:
      requesting an enterprise application token from an intermediate application gateway (IAG) using a dataset comprising a device identifier and a user identifier; and
   in the IAG:
      confirming an association between the device identifier and the user identifier included in the token request.

3. The distributed computer-implemented method of claim 1, wherein:
   the device identifier comprises a PIN of the device, and
   the user identifier comprises an e-mail address.

4. The distributed computer-implemented method of claim 1, wherein:
the device identifier comprises a mobile phone number of the device, and
the user identifier comprises an e-mail address.

5. A system for providing access to an enterprise application from a telecommunications device, the system comprising:
the telecommunications device comprising a client application;
a device server comprising a push technology network element; and
an intermediate application gateway (IAG);
wherein:
the device server is in communication with the client and the IAG;
the IAG and client are in indirect communication via the device server;
the client is operative to request an enterprise application token from the IAG using the dataset comprising at least one of: a device identifier and a user identifier;
the IAG is operative to:
prepare an enterprise application token in response to the request, and
push a first portion of the prepared token to a user-centered address associated with the telecommunications device;
push a second portion of the prepared token to a device-centered address associated with the telecommunications device;
the client is operative to:
receive the first portion of the prepared token and second portion of the prepared token;
assemble the first portion and second portion into a token;
employ the assembled token in communications addressed to an enterprise application stored on one or more application servers via the device server and the IAG with the device server and the IAG interposed between the telecommunications device and the one or more application servers; and
the IAG is operative to:
replace the token in each communication with identification information called for by the enterprise application; and
send the communication with the identification information to the enterprise application.

6. The system of claim 5 wherein:
a push destination comprises an e-mail address associated with the communications device.

7. The system of claim 5 wherein:
the IAG is further operative to confirm an association between the device identifier and the user identifier included in the token request.

8. The system of claim 5 wherein:
the device identifier comprises a PIN of the device, and
the user identifier comprises an e-mail address in a domain of the device server.

9. The system of claim 5 wherein:
the device identifier comprises a mobile phone number of the device, and
the user identifier comprises an e-mail address in a domain of the device server.

10. The system of claim 5 wherein:
the push technology network element comprises one of: a short message service center and a push proxy gateway.

11. A distributed computer program product for providing access to an enterprise application from a telecommunications device, the computer program product comprising:
non-transitory computer readable media distributed across a client, a device server comprising a push proxy gateway, and an intermediate application gateway (IAG);
a client programming module:
stored on the media, and
operative to:
request an enterprise application token from the IAG using the dataset comprising at least one of: a device identifier and a user identifier;
receive a first portion of a prepared token and a second portion of the prepared token;
assemble the first portion and second portion into a token;
employ the assembled token in communications addressed to an enterprise application stored on one or more application servers via the device server and the IAG with the device server and the IAG interposed between the telecommunications device and the one or more application servers;
an IAG programming module:
stored on the media, and
operative to:
prepare an enterprise application token in response to the request,
push the first portion of the prepared token to a user-centered address associated with the telecommunications device via the push proxy gateway;
push the second portion of the prepared token to a device-centered address associated with the telecommunications device via the push proxy gateway;
replace the token in each communication with identification information called for by the enterprise application; and
send the communication with the identification information to the enterprise application; and
a device server programming module:
stored on the media, and
operative to communicate between a plurality of devices and an IAG.

12. The distributed computer program product of claim 11 wherein:
the client programming module is operative to request an enterprise application token from an IAG using a dataset comprising a device identifier and a user identifier; and
the IAG programming module is further operative to confirm an association between the device identifier and the user identifier included in the token request.

13. The distributed computer program product of claim 11 wherein:
the device identifier comprises a PIN of the device, and
the user identifier comprises an e-mail address in a domain of the device server.

14. The distributed computer program product of claim 11 wherein:
the device identifier comprises a mobile phone number of the device, and
the user identifier comprises an e-mail address in a domain of the device server.

15. A system for providing access to an enterprise application from a telecommunications device, the system comprising:
- the telecommunications device comprising a client application;
- a device server comprising a push proxy gateway and an HTTP gateway; and
- an intermediate application gateway (IAG);

wherein:
- the device server is communication with the client and the IAG;
- the IAG and client are in indirect communication via the device server;
- the client is operative to request an enterprise application token from the IAG using the dataset comprising at least one of: a device identifier and a user identifier;
- the IAG is operative to:
  - prepare an enterprise application token in response to the request,
  - push a first portion of the prepared token to a user-centered address associated with the telecommunications device via the push proxy gateway;
  - push a second portion of the prepared token to a device-centered address associated with the telecommunications device via the push proxy gateway
- the client is operative to:
  - receive the first portion and second portion;
  - assemble the first portion and second portion into a token;
  - employ the assembled token in communications addressed to an enterprise application stored on one or more application servers via the device server and the IAG with the device server and the IAG interposed between the telecommunications device and the one or more application servers; and
- the IAG is operative to:
  - replace the token in each communication with identification information called for by the enterprise application; and
  - send the communication with the identification information to the enterprise application.

16. The system of claim 15 wherein:
an client programming module is operative to requesting an enterprise application token from an IAG using a dataset comprising a device identifier and a user identifier; and
an IAG programming module is further operative to confirm an association between the device identifier and the user identifier included in the token request.

17. The system of claim 15 wherein:
the device identifier comprises a PIN of the device, and
the user identifier comprises an e-mail address in a domain of the device server.

18. The system of claim 15 wherein:
the device identifier comprises a mobile phone number of the device, and
the user identifier comprises an e-mail address in a domain of the device server.

\* \* \* \* \*